(12) United States Patent
Badiola et al.

(10) Patent No.: US 11,525,507 B2
(45) Date of Patent: Dec. 13, 2022

(54) AXLE HOUSING WITH AT LEAST ONE DAM

(71) Applicant: Dana Heavy Vehicle Systems Group, LLC, Maumee, OH (US)

(72) Inventors: Virginia Badiola, Zuasti de Iza (ES); Shane Smith, Maumee, OH (US); Yulong Zhu, Maumee, OH (US)

(73) Assignee: Dana Heavy Vehicle Systems Group, LLC, Maumee, OH (US)

( * ) Notice: Subject to any disclaimer, the term of this patent is extended or adjusted under 35 U.S.C. 154(b) by 191 days.

(21) Appl. No.: 16/784,088

(22) Filed: Feb. 6, 2020

(65) Prior Publication Data

US 2020/0256456 A1  Aug. 13, 2020

Related U.S. Application Data

(60) Provisional application No. 62/802,387, filed on Feb. 7, 2019.

(51) Int. Cl.
*F16H 57/04* (2010.01)

(52) U.S. Cl.
CPC ..... *F16H 57/0483* (2013.01); *F16H 57/0423* (2013.01); *F16H 57/0445* (2013.01); *F16H 57/0453* (2013.01)

(58) Field of Classification Search
CPC ............. F16H 57/0483; F16H 57/0423; F16H 57/0445; F16H 57/0453
See application file for complete search history.

(56) References Cited

U.S. PATENT DOCUMENTS

| 916,888 | A | * | 3/1909 | Renault | B60B 35/16 |
| | | | | | 180/905 |
| 1,966,434 | A | * | 7/1934 | Barker | F16H 57/0483 |
| | | | | | 184/11.1 |
| 4,658,670 | A | | 4/1987 | Yasui et al. | |
| 5,067,350 | A | | 11/1991 | Grillo et al. | |
| 6,964,320 | B2 | | 11/2005 | Metelues et al. | |
| 6,991,574 | B2 | | 1/2006 | Martin, III | |
| 8,858,381 | B2 | | 10/2014 | Trost | |
| 8,974,342 | B2 | | 3/2015 | Kwasniewski et al. | |
| 9,267,596 | B2 | | 2/2016 | Trost | |
| 10,161,502 | B2 | * | 12/2018 | Kwasniewski | F16H 57/0445 |
| 10,167,944 | B2 | | 1/2019 | Kwasniewski et al. | |
| 2005/0005731 | A1 | | 1/2005 | Brill et al. | |
| 2006/0063633 | A1 | * | 3/2006 | Turner | F16H 57/0447 |
| | | | | | 475/220 |

(Continued)

FOREIGN PATENT DOCUMENTS

| CN | 107725742 A | 2/2018 | |
| EP | 3296596 A1 | 3/2018 | |
| EP | 3309428 A1 * | 4/2018 | ......... F16H 57/0421 |

*Primary Examiner* — Daniel D Yabut
(74) *Attorney, Agent, or Firm* — McCoy Russell LLP

(57) ABSTRACT

Systems are provided for an axle housing comprising at least one dam. In one example, an axle housing, comprising a center portion including a cavity configured to house a differential assembly and at least one dam arranged in an arm portion that extends from the center portion and is configured to receive an axle shaft, wherein the at least one dam comprises a flow facilitating protrusion that extends from the dam panel in a direction away from the center portion.

5 Claims, 8 Drawing Sheets

(56) References Cited

U.S. PATENT DOCUMENTS

| | | | | |
|---|---|---|---|---|
| 2014/0069230 A1* | 3/2014 | Trost | .................. | F16H 57/0457 |
| | | | | 74/607 |
| 2015/0219206 A1* | 8/2015 | Trost | .................. | F16H 57/0483 |
| | | | | 475/160 |
| 2015/0354691 A1* | 12/2015 | Keeney | ............... | F16H 57/0483 |
| | | | | 74/607 |
| 2018/0045298 A1* | 2/2018 | Kwasniewski | ..... | F16H 57/0483 |

\* cited by examiner

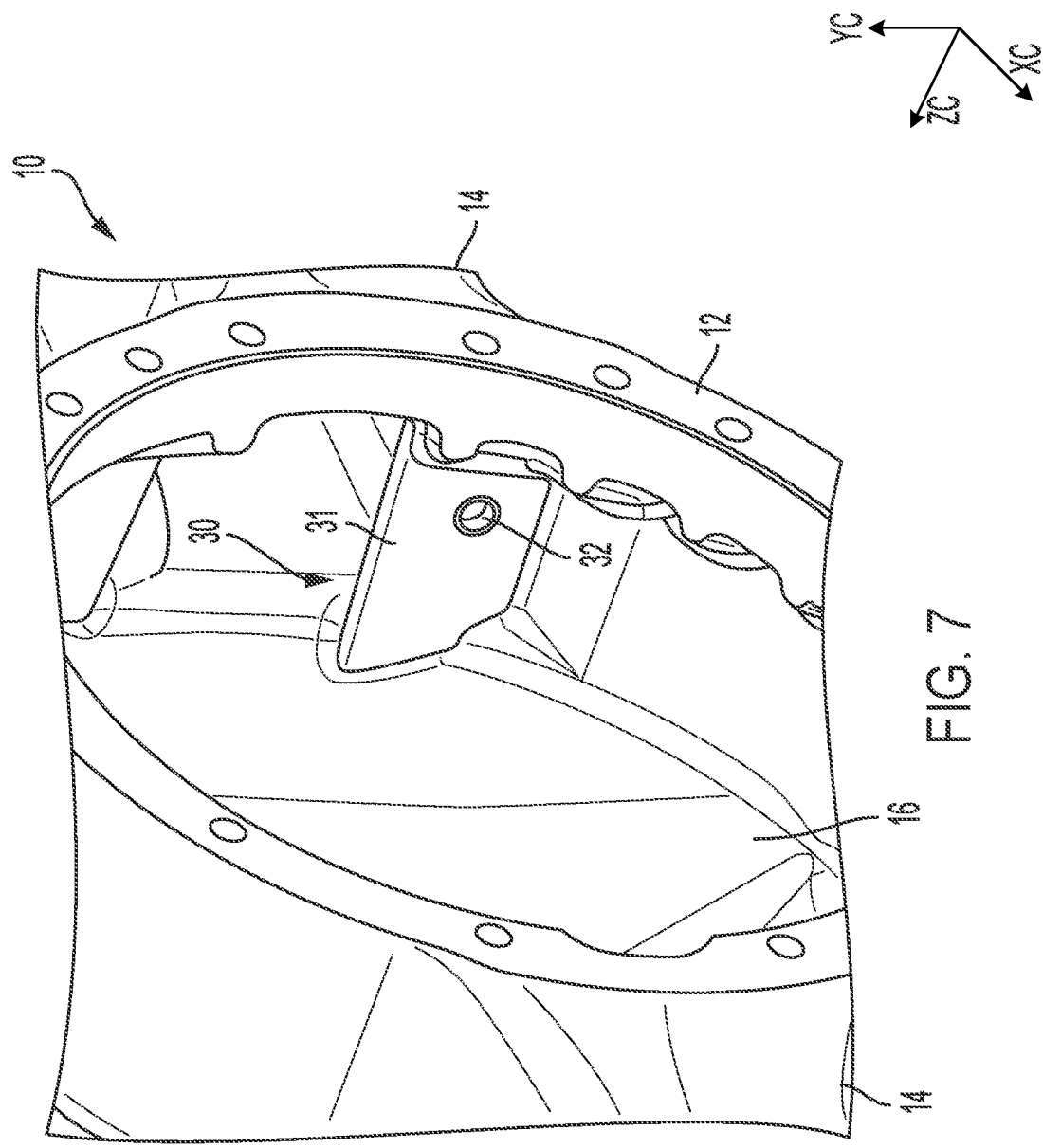

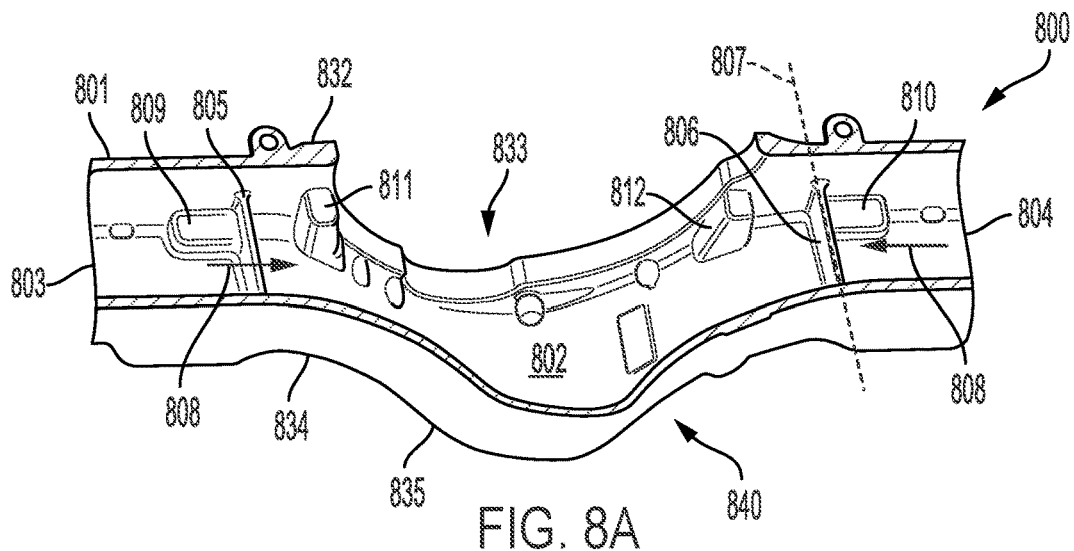
FIG. 8A
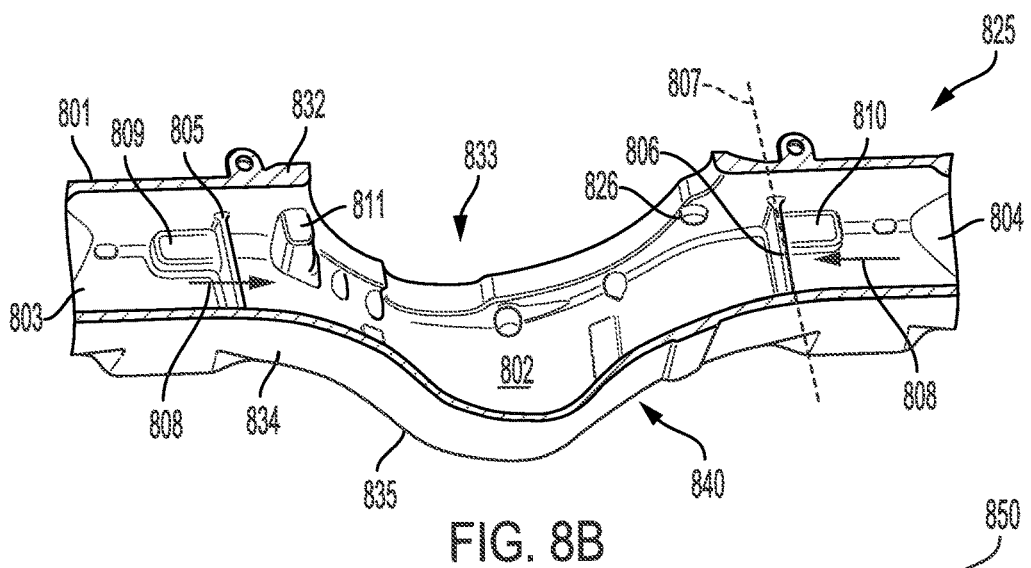
FIG. 8B
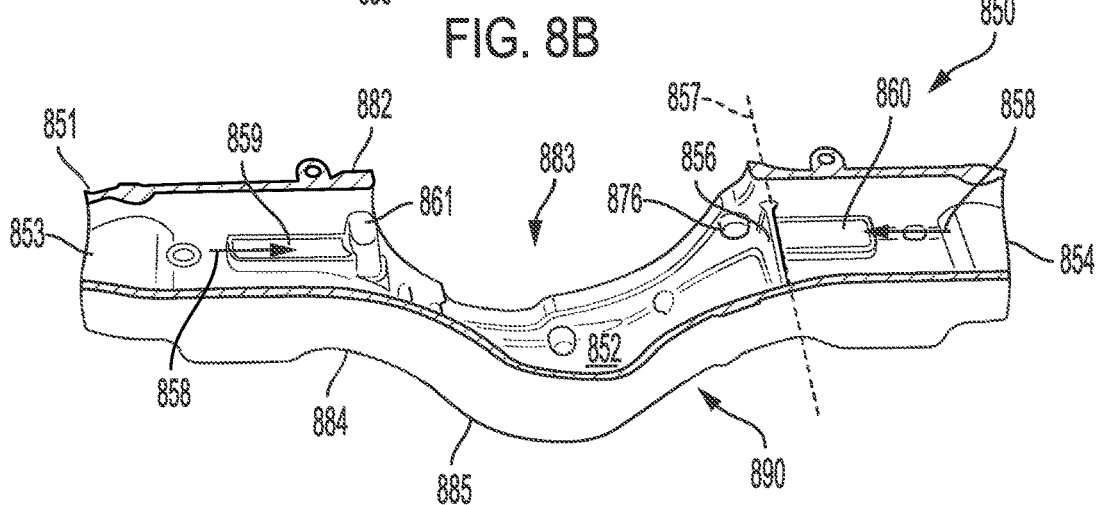
FIG. 8C
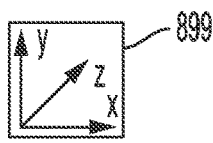

AXLE HOUSING WITH AT LEAST ONE DAM

CROSS-REFERENCE TO RELATED APPLICATIONS

The present application claims priority to U.S. Provisional Application No. 62/802,387, entitled "AXLE HOUSING WITH DAMS", and filed on Feb. 7, 2019. The entire contents of the above-listed application are hereby incorporated by reference for all purposes.

TECHNICAL FIELD

The present description relates generally to a lubricant housing comprising at least one dam.

BACKGROUND & SUMMARY

It is desired to utilize a lubricant within a housing of a mechanical device to smoothly operate the mechanical device and reduce wear. For example, an axle gear set in a vehicle differential axle housing has contact surfaces that mesh continuously. Wear protection is provided for the axle components, for example, the primary gearset, differential gears and spider, bearings, by having oil flow onto and around the contact surfaces. In addition, the lubricant provides a means to transfer away heat generated by friction at the contact surfaces. The lubrication and heat transfer aids in achieving a smooth operation and reducing wear. However, too much lubricant may create its own issues. For example, the mechanical device may experience power loss due to viscous oil drag resulting from the viscous oil resisting the motion of the rotating gears. This may occur due to uncontrolled lubricant flow into a sump portion of the axle housing. Additionally, uncontrolled lubricant flow may increase the resistance provided by the lubricant to the motion of the rotating gears, increasing temperature and wear on the device. As a result, automotive manufacturers may desire to control the amount of lubricant that splashes within vehicle differential axle housings by adjusting lubricant flow to a sump portion and controlling a volume of lubricant contacting the mechanical device by arranging one or more dams in a path of lubricant flow.

Provided herein is an axle housing including a center portion with a cavity configured to house a differential assembly, a first arm portion extending axially away from the center portion, a second arm portion extending axially in the opposite direction from the first arm and away from center portion, and at least one dam. Each dam includes a planar section, wherein the planar section of the at least one dam is positioned where an arm portion intersects with the center portion. The planar section of optional additional dams is positioned where a second arm portion intersects with the center portion such that the dams retain a volume of lubricant in the arm portions of the axle housing.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

A better understanding of the features and advantages of the embodiments will be obtained by reference to the following detailed description that sets forth illustrative embodiments, in which the principles of the embodiments are utilized, and the accompanying drawings of which:

FIG. 7 shows a detailed isometric view of a portion of the axle housing of FIG. 5;

FIG. 8A shows a second embodiment of an axle housing comprising a dam;

FIG. 8B shows a third embodiment of an axle housing comprising a dam; and

FIG. 8C shows a fourth embodiment of an axle housing comprising a dam.

DETAILED DESCRIPTION

Figure 1:
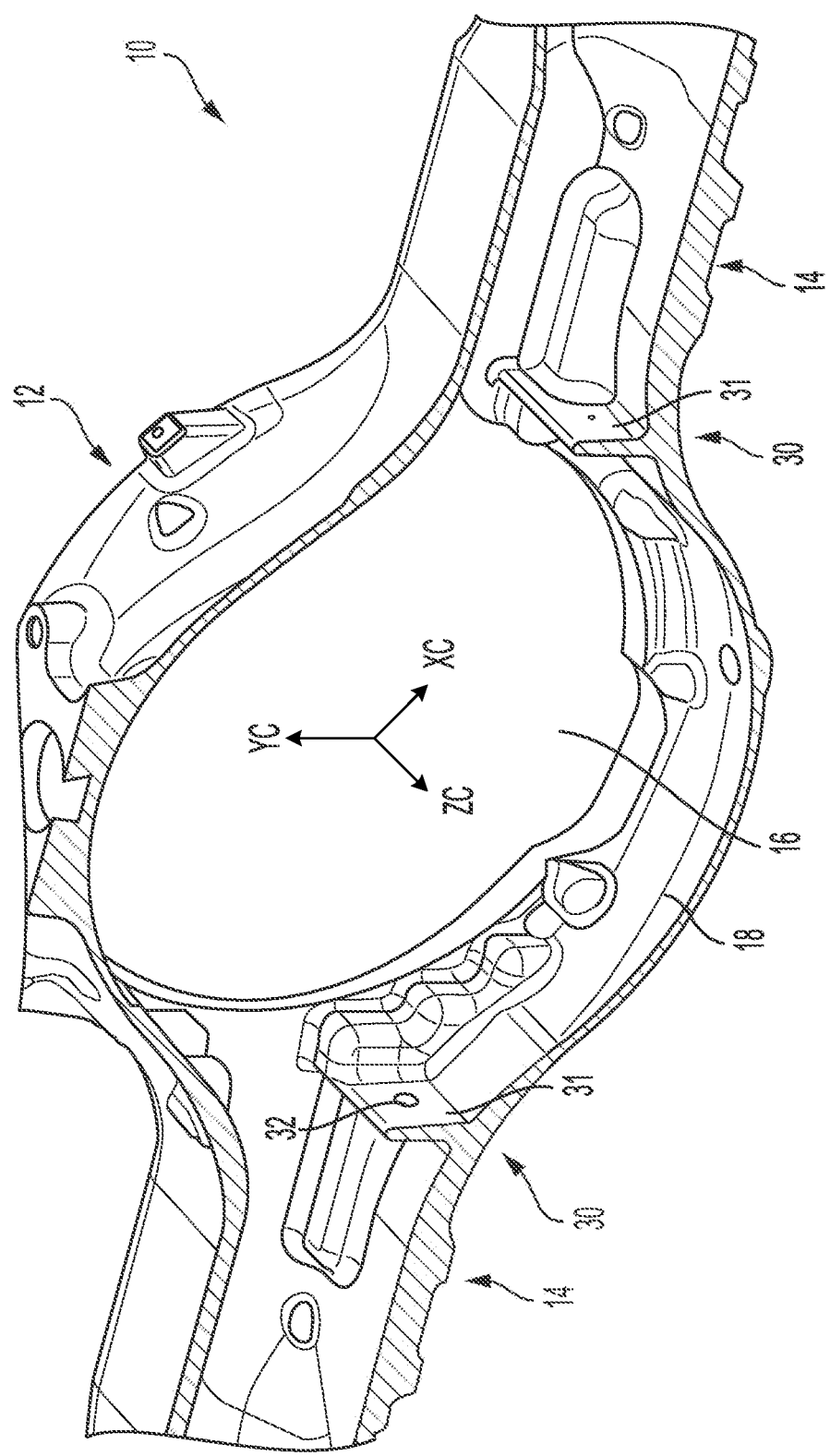
FIG. 1 shows a side perspective view of a cross-section of a center portion of a first embodiment of an axle housing.

It is to be understood that the disclosure may assume various alternative orientations, except where expressly specified to the contrary. It is also to be understood that the specific devices and processes illustrated in the attached drawings and described in the following specification are simply exemplary embodiments. Hence, specific dimensions, directions, orientations or other physical characteristics relating to the embodiments disclosed are not to be considered as limiting, unless expressly stated otherwise.

The following description relates to systems for an axle housing. While not intending to be limited, in one example, an axle housing configuration comprises an easy to manufacture configuration while still providing a storage space needed to reduce wear at contact surfaces of a gear set, reduce weight, improve heat transfer, reduce oil drag on parts, and use less oil, thereby better utilizing the oil and energy more efficiently along with other benefits, while still providing sufficient availability of the oil to the gear set.

FIGS. 1-8C show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example.

In some embodiments, the axle housing comprises features for adjusting lubricant flow into and within a sump portion of a central portion of the axle housing. FIGS. 1, 2, 3, 4, 5, 6, and 7 illustrate a first example of the axle housing comprising at least one dam having at least one aperture arranged therein. The aperture may be configured to allow lubricant to flow therethrough such that lubricant flowing through the aperture does not need to flow over the dam.

FIGS. 8A, 8B, and 8C illustrate additional examples for adjusting lubricant flow into and within a sump portion of a central portion of the axle housing comprising alternative embodiments of at least one dam arranged in the axle housing. As shown in FIGS. 8A, 8B, and 8C, in some embodiments, the at least one dam may be spaced away from a drain opening and/or from a boss, such as a carrier join boss which is upstream of a central portion in which a sump portion is arranged to receive lubricant. In some aspects, the at least one dam may be free of openings such that lubricant flowing to the sump portion flows over the dam. In other aspects, one or more of the at least one dam(s) may contain an aperture configured to allow lubricant to flow therethrough such that lubricant flowing through the aperture does not need to flow over the dam. In one example, an axle housing configuration comprises an easy to manufacture configuration while still providing a storage space needed to reduce wear at contact surfaces of a gear set, reduce weight, improve heat transfer, reduce oil drag on parts, and use less oil, thereby better utilizing the oil and energy more efficiently along with other benefits, while still providing sufficient availability of the oil to the gear set.

Referring to FIGS. 1-7, an embodiment of an axle housing 10 is shown. The axle housing 10 may be part of an axle assembly for a vehicle that may provide torque to one or more traction wheel assemblies include tandem axle or multi-axle assemblies. In some embodiments, the axle housing 10 shown is a banjo-style housing as shown in FIG. 1; however, other styles of axle housing can be used. An axes system comprising three axes, namely an x-axis (XC) parallel to a horizontal direction, a y-axis (YC) parallel to a vertical direction, and a z-axis (ZC) perpendicular to each of the x- and y-axes as shown in FIGS. 1-5 and 7 may be used for reference.

As shown in FIG. 1, the axle housing 10 may include a center portion 12 and at least one arm portion 14. As shown in FIG. 1, in some embodiments, the axle housing 10 includes two arm portions 14 that extend in axially opposite directions from the center portion 12. In some embodiments, the arm portions 12 or a portion thereof may be integrally formed with the center portion 12.

The axle housing 10 may receive various components of an axle assembly including a differential assembly. In addition, the axle housing 10 may facilitate mounting of the axle assembly to the vehicle. The axle housing 10 may include multiple components that may be assembled together in any suitable manner, such as by welding and/or attaching with one or more fasteners.

The center portion 12 is generally disposed proximate to the center of the axle housing 10. The center portion 12 may define a cavity 16 that receives at least a portion of a differential assembly including a differential carrier. The differential assembly may be configured to transmit torque to the vehicle traction wheel assemblies and permit the traction wheel assemblies to rotate at different velocities via one or more axles. In one example, the cavity 16 is identical to the sump portion 18. The one or more axles may transmit torque from the differential assembly to a wheel assembly. The axles may extend through the arm portions 14 and have a first end coupled to the differential assembly and a second end disposed opposite the first end and located outside of the axle housing 10. A lubricant, which may be oil, used to lubricate components of the axle housing 10, such as the differential assembly, is generally contained within the axle housing 10. The center portion 12 of the axle housing 10 may include a sump portion 18 that retains a portion of the lubricant.

While the axle housing 10 of FIGS. 1-5 is shown with at least two dams 30, in some aspects a single dam or a plurality of dams greater than two dams may be used. The dams 30 provide a lubricant reservoir to retain lubricant in the arm portions 14 of the axle housing 10, reducing the amount of lubricant stored in the sump portion 18. The lubricant reservoir retains lubricant that is splashed or sprayed inside the axle housing 10 by the differential assembly.

Figure 2:
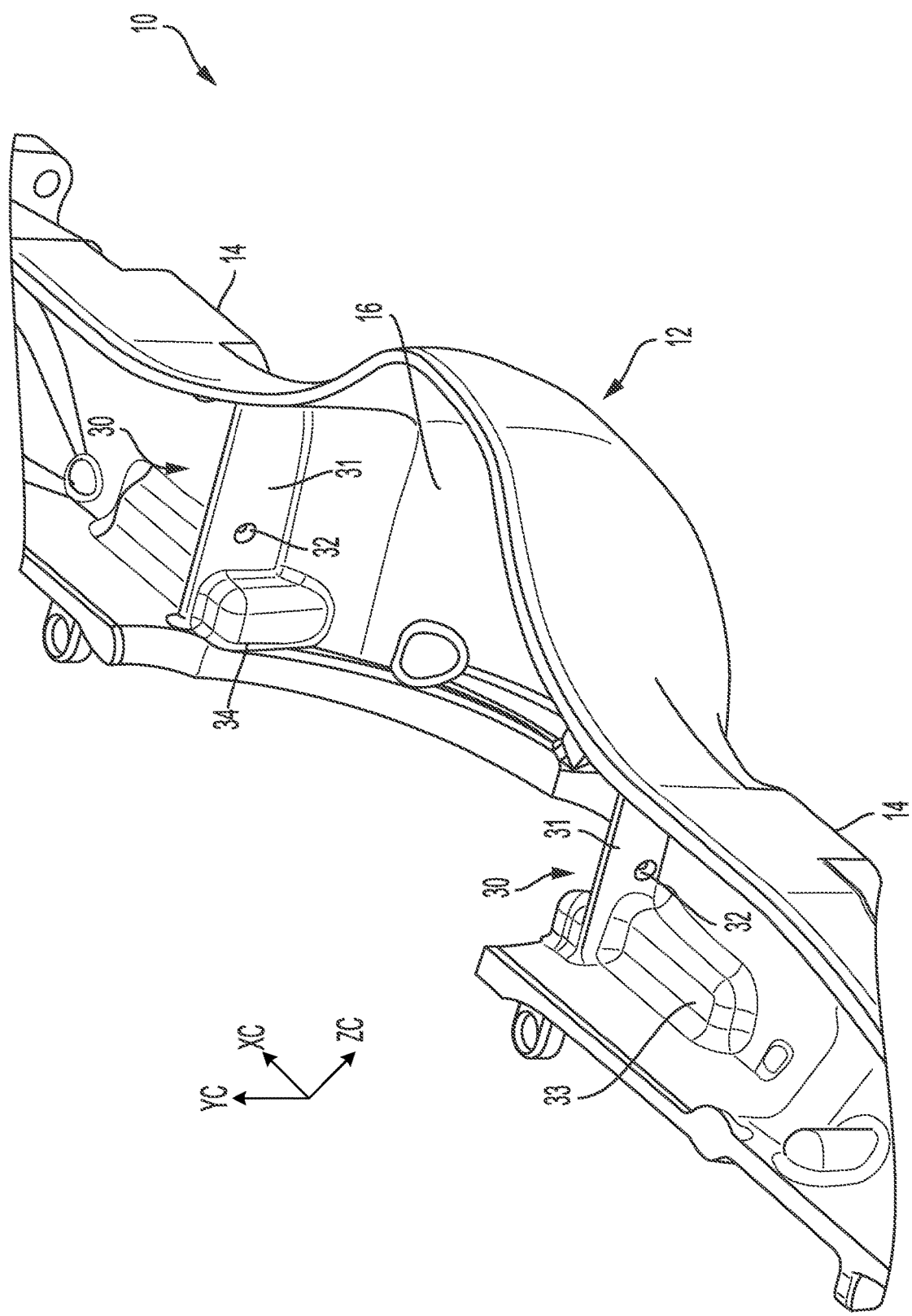
FIG. 2 shows a top perspective view of a cross-section of the center portion of the first embodiment of the axle housing.
Figure 5:
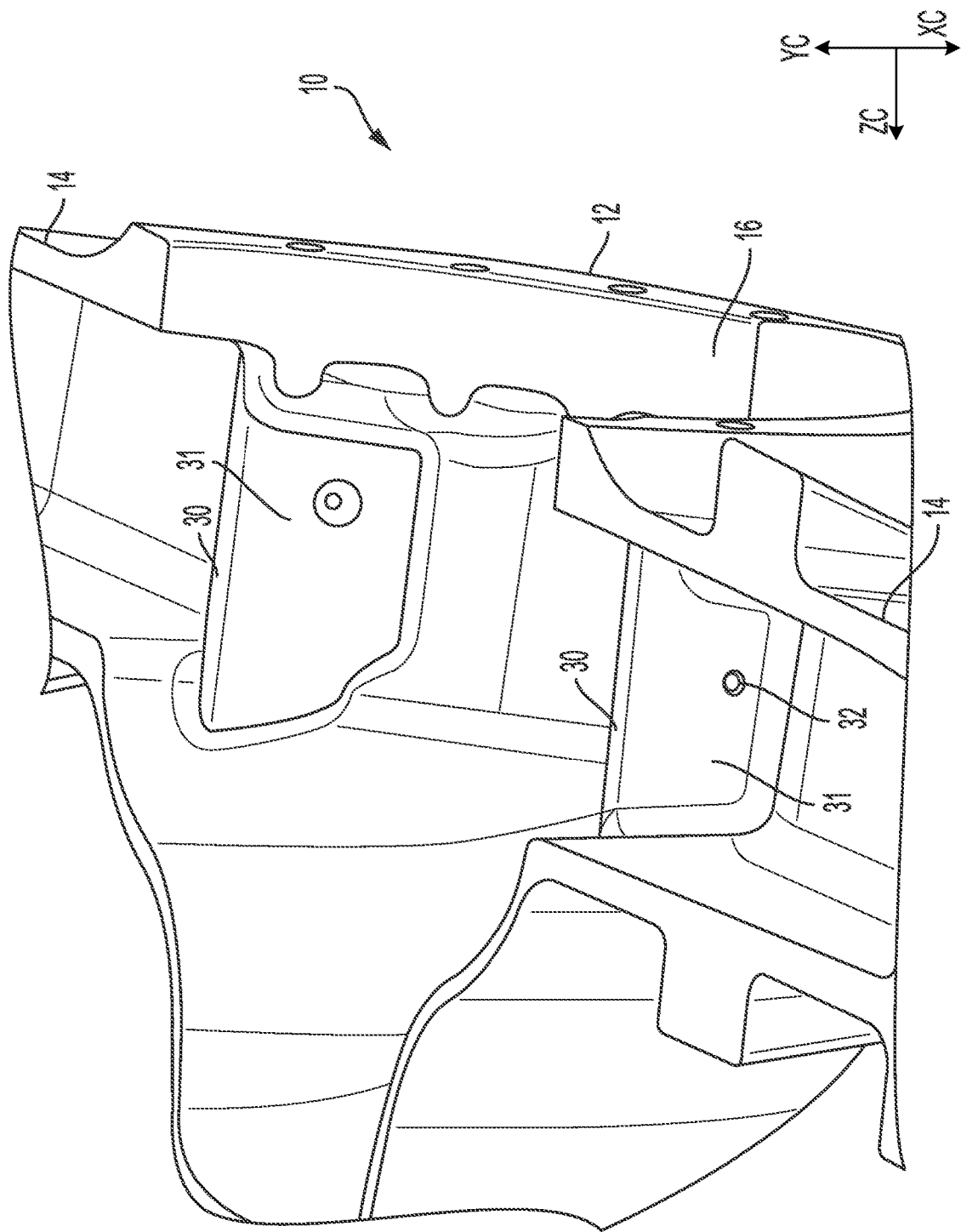
FIG. 5 shows a top perspective view of a cross-section of a portion of the first embodiment of the axle housing with an aperture arranged in a different location of a dam.
Figure 6:
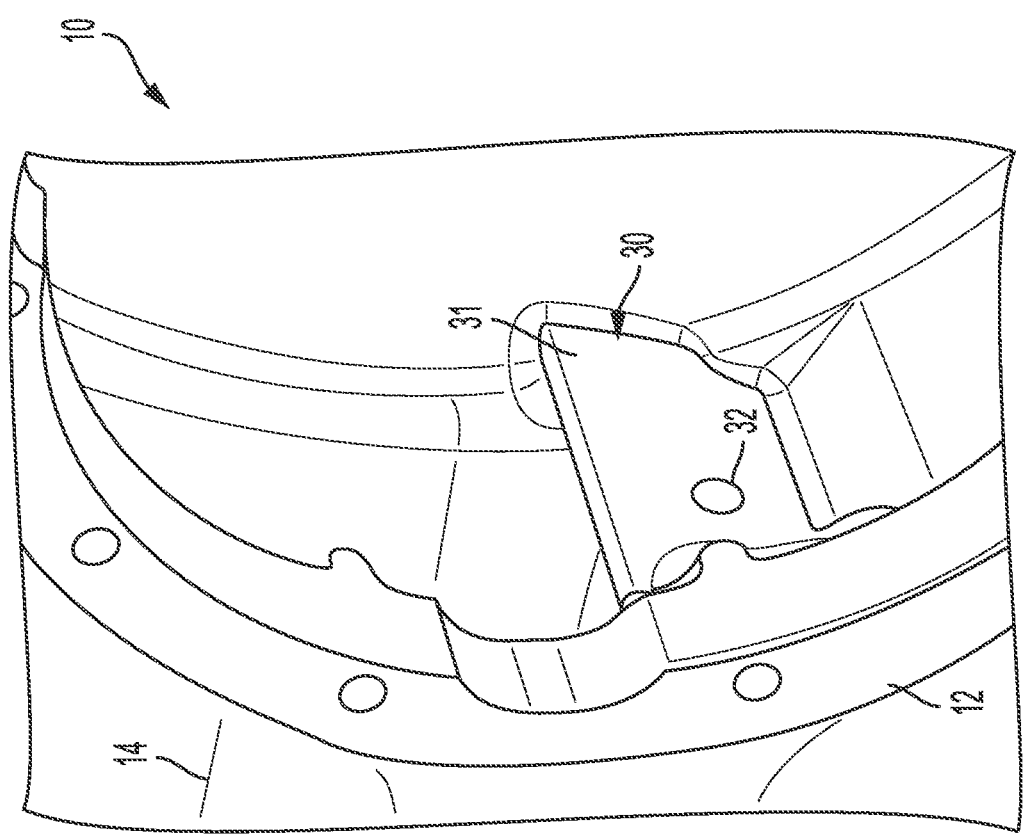
FIG. 6 shows a detailed isometric view of a portion of the axle housing of FIG. 5.

Each dam 30 is coupled to the interior surface of the axle housing 10 and may include an aperture 32 as shown in FIGS. 1-7. The dams 30 engage adjacent sides or surfaces of the axle housing 10 such as left, right, and bottom sides, to inhibit lubricant from flowing around the dam 30. In some embodiments, the dams 30 are positioned in the housing 10 where the center portion 12 meets the arm portion 14. In some embodiments, the dam 30 has a generally planar or wall-like configuration section 31. The planar section 31 engages adjacent sides or surfaces of the axle housing 10 such as left, right, to inhibit lubricant from flowing around the dam 30, though in some examples, such as when the aperture 32 is absent, the lubricant may be allowed to flow over the dam 30. As shown in FIGS. 1-7, the aperture 32 may be positioned in the planar section 31 of the dam 30. In some embodiments, the aperture 32 is positioned in the center of the planar section 31 as shown in FIGS. 1-4. In other embodiments, the aperture 32 may be positioned offset from the center of the planar section 31 as illustrated in FIGS. 5-7. For example, the aperture 32 may be placed higher, lower, left, or right of center or a combination thereof. In some embodiments, the size and position of the aperture on the planar sections of each dam may be the same. In other embodiments, the size and position of the aperture may be different as shown in FIGS. 1, 2 and 5.

In some embodiments, each dam 30 includes an arm extending section 33 and a center extending portion 34, each of which extend from planar section 31. In some embodiments, the arm extending section 33 extends from the planar section 31 along the inner surface of the housing 10. The arm extending section 33 extends partially along the arm portion 14 and into the arm portion 14.

In some embodiments, the planar section 31 extends perpendicular from the bottomed side of the axle housing as shown in FIG. 1. In some embodiments, the planar section 31 extends from the bottom surface at an angle less 90 degrees as shown in FIGS. 5-7.

As shown in FIG. 1, the arm extending section 33 has a height less than the height of the planar section portion 31. In some embodiments, the height of section 33 is less than half the height of the planar section 31. In some embodiments, the width of the arm extending section 33 is less than the width of the arm portion 14. In some embodiments, the width of the arm extending section 33 is less than half the width of the arm portion 14.

In some embodiments, as shown in FIG. 2, the arm extending section 33 has a substantially planar top, a side portion, and an end portion. The planar top extends from the planar section 31 to the end portion. The side portion extends from a planar top to the bottom inner surface of the axle housing 10. The end portion extends from the planar top to the bottom inner surface of the arm portion 14 of the axle housing 10.

In some embodiments, the center extending section 34 extends from the planar section 31 along the inner surface of the housing 10. The arm extending section 33 extends partially along the center portion 14 and into the center portion 12. As shown in FIG. 1, the center extending section 34 has a height less than the height of the planar section portion 31. In some embodiments, the height of section 34 is greater than half the height of the planar section 31. In some embodiments, the width of the center extending section 34 is less than the width of the arm portion 14. In some embodiments, the width of the center extending section 34 is less than half the width of the arm portion 14. In some embodiments, the width of the center extending section 34 is less than the width of the arm portion 14. In some embodiments, the width of the center extending section 34 is less than half the width of the arm portion 14. In some embodiments, the arm extending section 33 and the center extending section 34 include smooth surfaces joined together to forms the sections 33, 34 and provide smooth surfaces for the lubricant to flow over.

The dams 30 are integral with the axle housing 10. In some embodiments, the axle housing 10 is integrally formed by casting molten metal including, but not limited to, steel, into an appropriately shaped mold. Thus, the dams 30 and the axle housing 10 form a single piece of material cast into a predetermined shape. Furthermore, it has also been found desirable to form the additional components of the axle housing 10 (i.e., the brake flange, the spring seat, and the shock absorber pad) integrally with the tubes by casting.

The aperture 32 allows lubricant to flow through the dam 30 to the center portion 12 of the axle housing 10. The aperture 32 allows the lubricant to flow into the sump portion 18 at a controlled flow. Lubricant may also flow over the dam 30 into the sump portion 18 if the level of lubricant in the arm portions 14 is too high to maintain the desired amount of lubricant in the sump portion 18. In some aspects, the volume of the reservoir can be controlled by the height of the dam 30. The aperture 32 and other features of the dam 30 are illustrated in greater detail in FIGS. 5-7.

Turning now to FIG. 8A-C, an axes system 899 comprising three axes, namely an x-axis parallel to a horizontal direction, a y-axis parallel to a vertical direction, and a z-axis perpendicular to each of the x- and y-axes may be used for reference.

Referring to FIGS. 8A-B, embodiments 800 and 825 respectively of an axle housing 801 are shown. The axle housing may be part of an axle assembly for a vehicle that may provide torque to one or more traction wheel assemblies include tandem axle or multi-axle assemblies. As shown in FIG. 8A and 8B, in a second embodiment 800, the axle housing 801 is a banjo style housing comprising a sump portion 802 arranged between a first arm 803 and a second arm 804 in a center portion 840 of the axle housing 801. The first arm 803 may be arranged opposite the second arm 804 and separated by a diameter of the sump portion 802.

While the second embodiment 800 may comprise one or more dams, as shown in FIG. 8A, in some aspects, the axle housing 801 may include a first dam 805 and a second dam 806. The first dam 805 and the second dam 806 may be the same or different shapes and locate in the same or different locations in the arms. In some aspects, as shown, the first dam 805 and the second dam 806 may be substantially identical to one another in size and shape and placed in substantially identical locations in the respective arms. In the example of FIG. 8A, the first dam 805 and the second dam 806 comprise a substantially rectangular shape. Furthermore, an orientation of the first dam 805 and the second dam 806 may be the same or different. In some aspects, as shown, the orientation of the first dam 805 and the second dam 806 may be substantially identical, wherein both dams are parallel to an axis 807 which is normal to a direction of lubricant flow 808. The axis 807 is parallel to the z-axis of axes system 899. In one example, the first dam 805 and the second dam 806 are parallel to a y-z plane, wherein the dams are configured to control lubricant flow in the horizontal direction.

Figure 3:
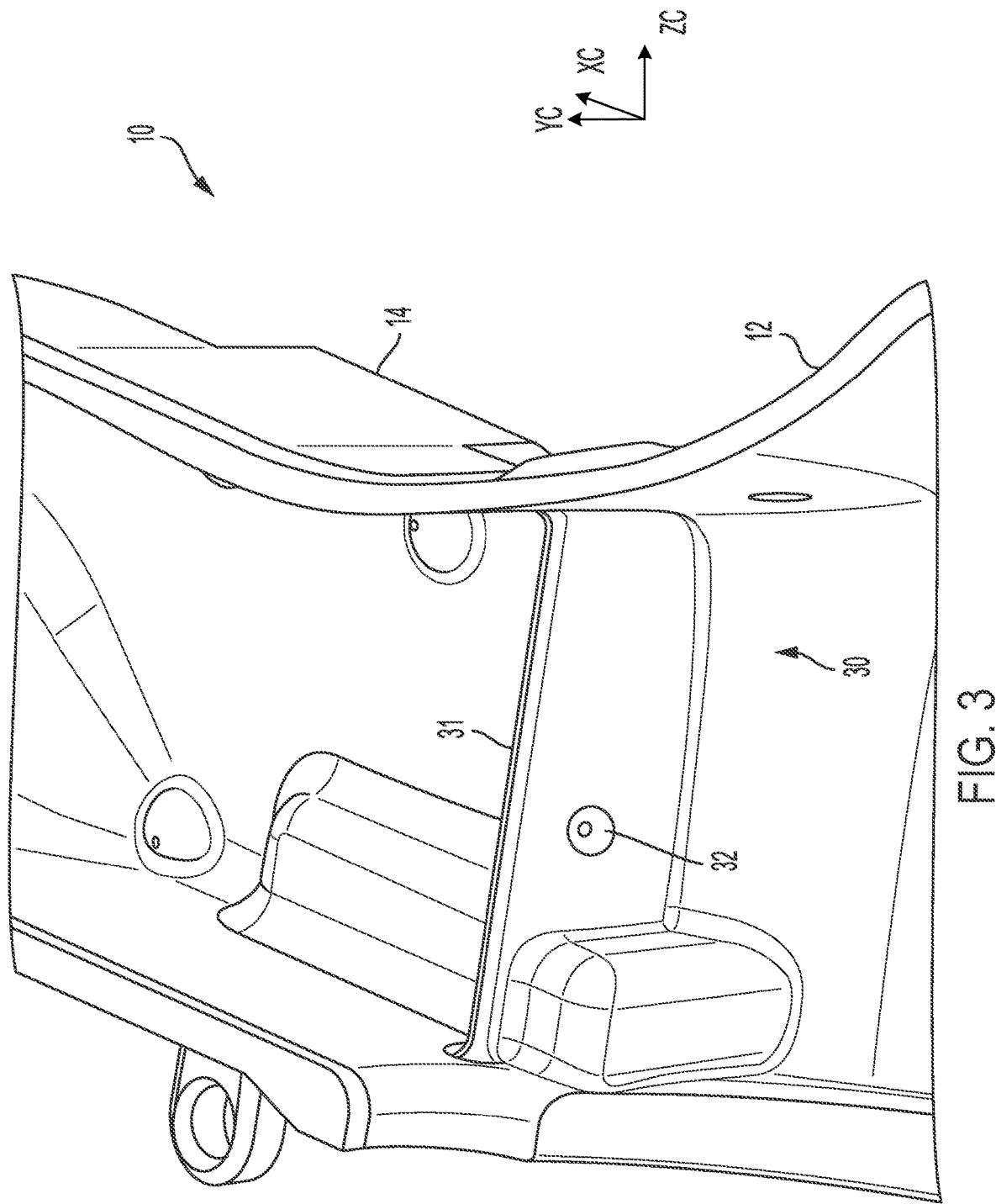
FIG. 3 shows a detailed partial view of a cross-section of the first embodiment of the axle housing.
Figure 4:
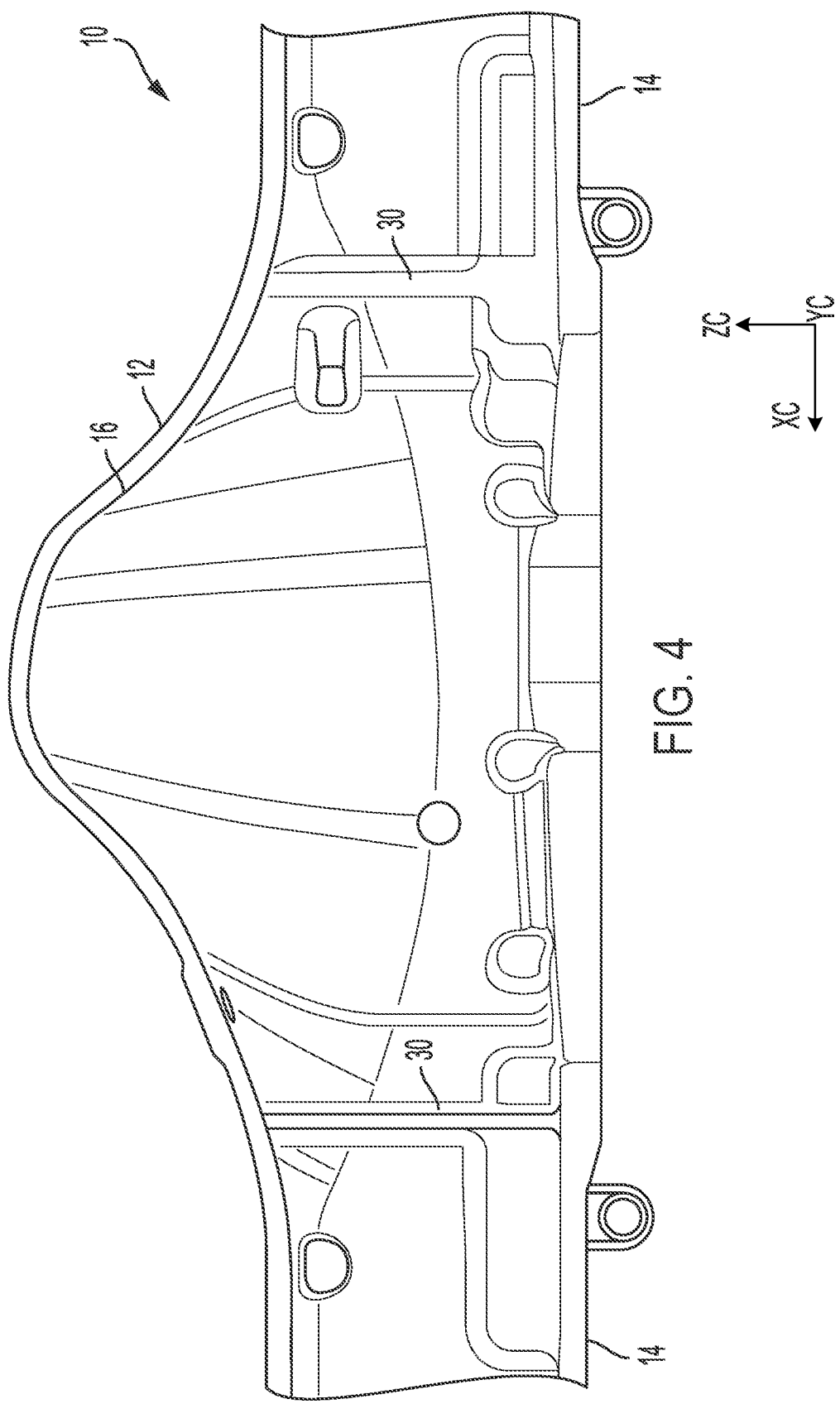
FIG. 4 shows a top cross-sectional view of the first embodiment of the axle housing.

As shown in FIG. 8A, the first dam 805 extends from a first surface 832 and a second surface 834 in the first arm 803. Similarly, the second dam 806 extends from the first surface 832 to the second surface 834 in the second arm 804. The first surface 832 comprises an opening 833 for receiving an axle and the second surface 834, opposite the first surface 832, comprises a protrusion 835 providing a sufficient amount of space for the axle to be arranged in the axle housing. The protrusion 835 extends in a direction away from the first surface 832. While not shown, in some aspects one or both dams may include an aperture as shown in FIGS. 1-3. The aperture may be placed at any location useful for its intended purpose. For example, it may be placed at a center of one or more of the dams or biased toward either the first surface 832 or the second surface 834. In other aspects, the aperture may be offset from the center and placed predominately to one side or another along a horizontal or vertical plane or both.

While the one or more dams may extend between the first surface 832 and the second surface 834 without any additional support, in some embodiments, the first dam 805 comprises a first flow facilitating protrusion 809 and the second dam 806 comprises a second flow facilitating protrusion 810. The first flow facilitating protrusion 809 may be physically coupled to, contiguous with, or adjacent to the first dam 805. The first flow facilitating protrusion 809 is arranged on a side of the first dam 805 facing a direction opposite the direction of lubricant flow 808. Said another way, the first dam 805 is arranged between the first flow facilitating protrusion 809 and the sump portion 802 such that no portion of the first flow facilitating protrusion 809 is arranged between the first dam 805 and the sump portion 802. In this way, the lubricant may contact the first flow facilitating protrusion 809 before contacting the first dam 805. In one example, the first flow facilitating protrusion 809 is impervious to lubricant flow such that lubricant flows around a surface of the first flow facilitating protrusion 809. However, after reaching the sump portion 802, the lubricant may not contact the first flow facilitating protrusion 809. In other aspects, lubricant may flow through an aperture (not shown) in the flow facilitating protrusion. In one example, the first flow facilitating protrusion 809 and the second flow facilitating protrusion 810 are configured to facilitate a casting material flow toward the dam(s) and the central portion 840 during a manufacturing process to reduce a porosity of those components. In this way, the first and second flow facilitating protrusions do not function as supports or comprise a function following manufacture of the axle housing 801.

In some embodiments, the second flow facilitating protrusion 810 is physically coupled to the second dam 806 regardless of whether a flow facilitating protrusion is provided for the first dam 805 and vice versa. The second flow facilitating protrusion 810 is arranged on a side of the second dam facing a direction opposite the direction of lubricant flow 808 and away from the first dam 805. Said another way, the second dam 806 is arranged between the second flow facilitating protrusion 810 and the sump portion 802 such that no portion of the second flow facilitating protrusion 810 is arranged between the second dam 806 and the sump portion 802. In this way, lubricant in the sump portion 802 may not contact the first flow facilitating protrusion 809 or the second flow facilitating protrusion 810. The sump portion 802 may be defined as a volume or a reservoir arranged in the center portion 840 between the first arm 803 and the second arm 804 configured to receive an amount of lubricant flowing past the first dam 805 and the second dam 806. That is to say, lubricant in a cavity corresponding to the sump portion 802 of the center portion 840 may not contact the first flow facilitating protrusion 809 or the second flow facilitating protrusion 810, wherein the sump portion 802 is between the first arm 803 and the second arm 804.

In the example of FIG. 8A, the first flow facilitating protrusion 809 is arranged adjacent to the first surface 832 and distal to the second surface 834. That is to say, the first flow facilitating protrusion 809 is in contact with the first surface 832 and extends toward the second surface 834 without contacting the second surface. In one example, the first flow facilitating protrusion 809 extends less than half the distance between the first surface 832 and the second surface 834. In some examples, the first flow facilitating protrusion 809 may span the entire distance between the first surface 832 and the second surface 834. An arrangement of the second flow facilitating protrusion 810 may be identical to or different from the first flow facilitating protrusion 809.

A height of the first flow facilitating protrusion 809 may be less than or equal to the height of the first dam 805. Similarly, a height of the second flow facilitating protrusion 810 may be less than or equal to the height of the second dam 806. In one example, the first flow facilitating protrusion 809 and the second flow facilitating protrusion 810 comprise substantially identical heights, wherein the heights of the flow facilitating protrusions are less than the heights of the dams. Additionally or alternatively, surfaces of the flow facilitating protrusions may be contoured and free of corners such that lubricant flow contacting the supports may be minimally perturbed, which may reduce a likelihood of splashing within the sump portion 802. That is to say, a laminar flow of the lubricant may be less affected by the contoured surfaces of the first flow facilitating protrusion 809 and the second flow facilitating protrusion 810.

Additionally or alternatively, the first flow facilitating protrusion 809 and the second flow facilitating protrusion 810 may be artifacts of manufacturing, supports for a boss, or a product of casting. As such, the first flow facilitating protrusion 809 and the second flow facilitating protrusion 810 may not support the first dam 805 and the second dam 806 respectively. In one example, the first dam 805 may be supported via physical couplings to the first surface 832 and the second surface 834 at extreme ends of the first dam 805. Likewise, the second dam 806 may be supported via physical coupling to the first surface 832 and the second surface 834 at extreme ends of the second dam 806. In this way, the first dam and the second dam may be free of supports spaced away from the first surface 832 and the second surface 834.

The second embodiment 800 further comprises where each of the first dam 805 and the second dam 806 do not have any flow facilitating protrusions on the side facing the center portion 840. That is, there is only a protrusion attached to the dam on the side of the dam facing away from the center portion 840. For example, as shown in FIG. 8A, the first dam 805 and the second dam 806 are spaced away from a first boss 811 and a second boss 812, respectively. A space between the first dam 805 and the first boss 811 may be similar or different than a space between the second dam 806 and the second boss 812. While any distance may be used, in some aspects, the space between a front of a dam and boss may be between 2 to 50 mm. In some examples, additionally or alternatively, the space may be between 5 to 15 mm. In one example the space is exactly 10 mm. In another example, the space may be 2 mm. While the first boss 811 and the second boss 812 may serve the same or different purposes, in one example, each of the first boss 811 and the second boss 812 function as bolt housings for a bolt physically coupling a differential carrier to an exterior of the axle housing 801. In one example, the differential carrier may be an assembly which holds all of the rotating elements.

Turning now to FIG. 8B, it shows a third embodiment 825 of the axle housing 801. In one example, the third embodiment is substantially similar to the second embodiment 800 of FIG. 8A except that the second boss 812 is omitted and replaced with an opening 826. A spacing between the opening 826 and the second dam 806 may be similar to the spacing between the second dam 806 and the second boss 812. Additionally or alternatively, the spacing may be decreased or increased without departing from the scope of the present disclosure. Such an opening 826 may replace the first or second boss or both.

The opening 826 may function as a drain, wherein lubricant may flow through the opening and into a reservoir or other lubricant storage container. A positioning of the opening 826 may be based on a desired maximum fill level of the sump portion 802. In one example, the opening 826 aligns with a highest point of the second dam 806, and therefore the first dam 805, such that a lubricant fill line does not exceed a highest point of the dams. Additionally or alternatively, the opening 826 may be placed below or above the highest point of the first dam 805 and the second dam 806 without departing from the scope of the present disclosure.

The opening 826 may be arranged on the first surface 832 between the opening 833 and the second dam 806. More specifically, the opening 826 is arranged between the second boss 812 and the second dam 806. In one example, the opening 826 may be arranged adjacent to the second arm 804. In a further example, the opening 826 may be arranged at an intersection between the center portion 840 and the second arm 804.

As shown in the embodiments of FIGS. 8A and 8B, arranging the dams in an orientation perpendicular to lubricant flow may enhance flow characteristics of lubricant reaching the sump portion 852. For example, a momentum of lubricant may be reduced, which may decrease splashing within the sump portion 852. In other examples where the dams are angled less than or greater than 90 degrees relative to lubricant flow, the lubricant momentum may be steady or increase, which may result in splashing, which is undesired.

The first dam 805 and the second dam 806 are arranged upstream of a transition between the first arm 803 and the second arm 804 and the center portion 840 relative to the direction of lubricant flow 808. In one example, the first boss 811 is arranged at an interface between the first arm 803 and the central portion 840 and the opening 826 is arranged at an interface between the second arm 804 and the central portion 840. In this way, the central portion 840, and the sump portion 802, are free of the first dam 805, the second dam 806, the first flow facilitating protrusion 809, and the second flow facilitating protrusion 810.

Turning now to FIG. 8C, it shows a fourth embodiment 850 of an axle housing 851, wherein only one dam 856 is included. The axle housing may be part of an axle assembly for a vehicle that may provide torque to one or more traction wheel assemblies include tandem axle or multi-axle assemblies. In one example, the only one dam 856 is substantially identical to the second dam 806 of FIGS. 8A and 8B. A first element 859 extends along a first arm 853 adjacent to a first surface 882 and contacts a first boss 861 without touching a second wall 884. The first boss 861 is upstream of an opening 883 and a sump portion 852 of a central portion 890 of the axle housing 851 between the first arm 853 and the second arm 854. In one example, the first arm 853, the second arm 854, the first surface 882, the second surface 884, the first boss 861, the sump portion 852 and the central portion 890 are similar to the first arm 803, the second arm 804, the first surface 832, the second surface 834, the first boss 831, the sump portion 802, and the central portion 840 of FIGS. 8A and 8B, in size and shape, respectively. In one example, the fourth embodiment 850 differs from the third embodiment 825 in only that the first dam 805 is omitted and the first element 859 contacts the first boss 861 while the first flow facilitating protrusion 809 of the third embodiment 825 is spaced away from the first boss 811. As such, an opening 876, which functions as a drain and is arranged between the opening 883 and the only one dam 856, is identical to the opening 826 of FIG. 8B. The fourth embodiment 850 further comprises a protrusion 885 and a second flow facilitating protrusion 860 identical to the protrusion 835 and the second flow facilitating protrusion 810 of FIG. 8B, respectively.

Lubricant flows parallel to the x-axis along flow directions 858, which are perpendicular to a y-z plane to which the only one dam 856 is parallel. As such, the flow of lubricant collides with the only one dam 856 and does not flow therethrough. However, the lubricant may flow above a height of the only one dam and to the sump portion 852. By arranging only one dam 856, an increased amount of lubricant may flow to the sump portion 852 relative to the third embodiment 825, while the opening 876 may still moderate the lubricant volume in the sump portion 852 to a desired level.

In one example of the fourth embodiment 850, the spacing between the second dam 806 and the opening 876 may be different than the spacing in the third embodiment 825 of FIG. 8B, wherein the spacing is reduced relative to the third embodiment 825. In other examples, the spacings may be the same. In a further example, the opening 876 may be replaced by a boss as in FIG. 8A. In some examples, the dam may have an aperture as in FIGS. 1-3.

One or more of the dams may be integral with the axle housing. In some embodiments, the axle housing is integrally formed by casting molten metal including, but not limited to, steel, into an appropriately shaped mold. Thus, one or more of the dams and the axle housing form a single piece of material cast into a predetermined shape. In further examples, the additional components of the axle housing (i.e., the brake flange, the spring seat, and the shock absorber pad) may also be integrally formed with the tubes by casting. In this way, an axle housing comprises at least one dam configured to adjust a lubricant flow into the sump portion. The technical effect of the at least one dam, which is arranged normal to lubricant flow, is to decrease splashing. Furthermore, a flow facilitating protrusion of the at least one dam extends away from a sump portion of the axle housing, which may further limit splashing by increasing a smoothness of a surface of the sump portion.

While the preferred embodiments have been shown and described herein, it will be obvious to those skilled in the art that such embodiments are provided by way of example only. Numerous variations, changes, and substitutions will now occur to those skilled in the art without departing from the embodiments. It should be understood that various alternatives to the embodiments described herein are capable of being employed in practicing the embodiments.

The invention claimed is:

1. A system, comprising:
an axle housing comprising a center portion configured to receive a differential and an arm portion that extends from the center portion and configured to receive an axle shaft;
only one dam arranged in a first arm of the axle housing comprising a planar configuration and configured to define a volume of the center portion in which a sump portion is arranged, wherein the only one dam is arranged between the center portion and a flow facilitating protrusion to which the only one dam is physically coupled, and wherein the only one dam is oriented parallel to an axis normal to a direction of lubricant flow; and
a boss arranged outside of the sump portion, wherein the boss is spaced away from the only one dam and in contact with lubricants;
a first element extending along a second arm adjacent to a first surface and contacts the boss without touching a second wall;
wherein the dam, the flow facilitating portion, the boss and the first element are integrally formed with the axle housing as a single piece.

2. The system of claim 1, wherein the axle housing is a banjo style axle housing.

3. The system of claim 1, wherein the dam is configured to block lubricant flow, and wherein a lubricant flows to the center portion via flowing over the dam.

4. The system of claim 1, wherein the boss is a bolt housing.

5. The system of claim 1, wherein the at least ono dam is spaced away from a drain opening, the drain opening arranged between the at least no dam and a sump portion.

* * * * *